United States Patent
Swarup et al.

(10) Patent No.: US 8,143,341 B2
(45) Date of Patent: Mar. 27, 2012

(54) AQUEOUS COATING COMPOSITIONS

(75) Inventors: Shanti Swarup, Allison Park, PA (US); Calum H. Munro, Wexford, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 550 days.

(21) Appl. No.: 11/392,125

(22) Filed: Mar. 29, 2006

(65) Prior Publication Data

US 2007/0232746 A1    Oct. 4, 2007

(51) Int. Cl.
- *C08F 20/00* (2006.01)
- *C08G 18/00* (2006.01)
- *C08G 18/42* (2006.01)
- *C08G 63/00* (2006.01)
- *C08G 73/00* (2006.01)
- *C08J 3/00* (2006.01)
- *C08K 3/20* (2006.01)
- *C08L 51/00* (2006.01)
- *C08L 67/00* (2006.01)

(52) U.S. Cl. ... 524/500; 524/539; 525/437; 525/440.01; 525/440.15

(58) Field of Classification Search ............ 524/539, 524/500; 525/440, 437, 440.01, 440.15
See application file for complete search history.

(56) References Cited

U.S. PATENT DOCUMENTS

| | | | |
|---|---|---|---|
| 4,859,743 A | 8/1989 | Ambrose et al. | |
| 5,468,802 A * | 11/1995 | Wilt et al. | 524/539 |
| 5,663,233 A | 9/1997 | Berderke et al. | |
| 5,972,809 A | 10/1999 | Faler et al. | 442/103 |
| 6,169,150 B1 | 1/2001 | Swarup et al. | |
| 6,538,059 B1 | 3/2003 | Muller et al. | 524/591 |
| 6,582,822 B2 | 6/2003 | Faler et al. | 428/411.1 |
| 2003/0045653 A1 * | 3/2003 | Flosbach et al. | 525/440 |
| 2003/0216516 A1 | 11/2003 | Swarup et al. | 525/123 |

FOREIGN PATENT DOCUMENTS

| | | |
|---|---|---|
| EP | 0 653 468 A | 5/1995 |
| EP | 0 688 840 A | 12/1995 |
| EP | 0 940 415 A2 | 9/1999 |
| GB | 1 603 049 A | 11/1981 |
| WO | WO 94/05733 A | 3/1994 |
| WO | WO 96/34924 A | 11/1996 |
| WO | WO 2005/052077 | 6/2005 |

OTHER PUBLICATIONS

Frank, "Mass spectrometric detection of cross-linked fatty acids formed during radical-induced lesion of lipid membranes", Biochem J. (1989) 260-873-878 vol. 260 (Gr. Britain).

* cited by examiner

*Primary Examiner* — Patrick Niland
(74) *Attorney, Agent, or Firm* — Steven W. Hays

(57) ABSTRACT

An aqueous coating composition containing a colorant, a film-forming polymer and a curing agent. The composition further comprises an adjuvant resin having two or more functional groups reactive with the curing agent and positioned between the functional groups a moiety containing at least 10 contiguous carbon atoms.

6 Claims, No Drawings

AQUEOUS COATING COMPOSITIONS

FIELD OF THE INVENTION

The present invention relates to aqueous coating compositions and more particularly to waterborne base coats that can be used in color-clear composite coatings for automotive applications.

BACKGROUND OF THE INVENTION

Environmental concerns have caused industrial coating suppliers and users to reduce atmospheric pollution caused by volatile organic solvents that are emitted during the coating process. To address these concerns the coatings industry has formulated waterborne compositions that provide coatings with excellent physical and chemical properties. However, one problem with waterborne coating compositions particularly those used to form topcoats for automotive applications, is the formation of a defect-free film under a wide range of humidity conditions. Often the coatings are rougher than desired and have microscopic holes ("pinholing"), which adversely affect the physical properties of the coating. Controlling the humidity within narrow limits is often not possible in industrial applications without incurring considerable expense.

Therefore, it would be desirable to formulate an aqueous coating composition that can be deposited as a smooth coating, substantially free of defects under a variety of humidity conditions.

SUMMARY OF THE INVENTION

The present invention provides for an aqueous coating composition that comprises water, coloring agents, a film-forming polymer containing functional groups, curing agents for the film-forming polymer having functional groups that are reactive with the functional groups of the film-forming polymer and an adjuvant resin having two or more terminal functional groups reactive with the functional groups of the curing agent and positioned between the terminal functional groups a moiety having a hydrocarbon chain of at least ten contiguous carbon atoms. The adjuvant resin has a functional equivalent weight of from 100-500 and an acid value less than five. The coating composition is particularly useful as an automotive topcoat particularly as a base coat under a clear coat and a composite color-clear composite coating.

DETAILED DESCRIPTION

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The aqueous coating composition of the present invention can be used as any of the waterborne compositions useful in coatings applications, particularly automotive applications. The aqueous coating composition of the present invention can be used as a primer, a colored monocoat deposited over a primer and as a colored base coat in a "color-plus-clear" coating system.

Useful crosslinkable film-forming polymers containing functional groups (also referred to as crosslinkable film-forming resins) include acrylic polymers and copolymers, polyesters, including alkyds, polyurethanes, polyamides, polyethers and mixtures thereof. These polymers can be self-crosslinking or crosslinked by reaction with suitable crosslinking materials included in the coating composition.

Suitable acrylic polymers and copolymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, such as 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride; and vinyl esters such as vinyl acetate.

The acrylic copolymer can include hydroxyl functional groups that are often incorporated into the polymer by including one or more hydroxyl functional monomers in the reactants used to produce the copolymer. Useful hydroxyl functional monomers include hydroxyalkyl acrylates and methacrylates, preferably having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates. The acrylic polymer can be prepared with N-(alkoxymethyl)acrylamides and N-(alkoxymethyl) methacrylamides that result in self-crosslinking acrylic polymers.

Acrylic polymers can be prepared via aqueous emulsion polymerization techniques and used directly in the preparation of the aqueous coating composition, or via organic solution polymerization techniques with groups capable of salt formation such as acid or amine groups. Upon neutralization of these groups with a base or acid, the polymers can be dispersed into aqueous medium. Generally, suitable crosslinkable film-forming resins have a weight average molecular weight greater than 2000 grams per mole, such as ranging from 2000 to 100,000 grams per mole (as determined by gel permeation chromatography using a polystyrene standard), and a hydroxyl equivalent weight ranging from 400 to 4000 grams per equivalent. The term "equivalent weight" is a calculated value based on the relative amounts of the various ingredients used in making the specified material and is based on the solids of the specified material. The relative amounts are those that result in the theoretical weight in grams of the material, such as a polymer produced from the ingredients, and give a theoretical number of the particular functional group that is present in the resulting polymer. The theoretical polymer weight is divided by the theoretical number to give the equivalent weight. For example, hydroxyl equivalent weight is based on the equivalents of reactive pendant and/or terminal hydroxyl groups in the hydroxyl-containing polymer.

The crosslinkable film-forming resin can have an acid value ranging from 5 to 100 mg KOH/g resin, such as 20 to 100 mg KOH/g resin. The acid value (number of milligrams of KOH per gram of solid required to neutralize the acid functionality in the resin) is a measure of the amount of acid functionality in the resin.

Generally, the crosslinkable film-forming resin is present in an amount ranging from 40 to 94, such as 50 to 80 percent by weight on a basis of total weight of resin solids of the topcoat coating composition. The aqueous coating composition further comprises one or more curing agents or crosslinking materials capable of reacting with the crosslinkable film-forming resin to form a crosslinked film. The crosslinking material can be present as a mixture with the other components of the aqueous coating composition (conventionally referred to as a one-pack system), or in a separate composition which is mixed with the crosslinkable film-forming resin within a few hours prior to application of the coating composition to the substrate (conventionally referred to as a two-pack system).

Suitable crosslinking materials include aminoplasts, polyisocyanates, polyacids, anhydrides and mixtures thereof. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541.

The aminoplast resins preferably contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The aminoplast resins typically are substantially alkylated with methanol or butanol.

The polyisocyanate that is utilized as a crosslinking agent can be prepared from a variety of isocyanate-containing materials. Preferably the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols also can be used. Examples of suitable blocking agents include those materials that would unblock at elevated temperatures such as lower aliphatic alcohols including methanol, oximes such as methyl ethyl ketoxime, lactams such as caprolactam and pyrazoles such as dimethyl pyrazole.

Generally, the crosslinking material is present in an amount ranging from 5 to 50, such as 10 to 40 weight percent on a basis of total weight of resin solids of the aqueous coating composition The coloring agent can be a pigment or a dye. In general, pigments and/or dyes are incorporated into the coating composition in amounts of 1 to 80 percent, and usually 1 to 30 percent by weight based on total weight of the coating composition. Color pigments conventionally used in surface coatings include inorganic pigments such as titanium dioxide, iron oxide, chromium oxide, lead chromate, and carbon black; and organic pigments such as phthalocyanine blue and phthalocyanine green. Metallic flake pigments are also useful in waterborne compositions of the present invention. Suitable metallic pigments include aluminum flake, copper bronze flake and metal oxide coated mica. In one embodiment, the comprise aluminum flake.

Water is the main diluent in the coating composition and is present in amounts of 20 to 80, such as 30 to 70 percent by weight based on total weight of the coating composition.

As mentioned above, the improvement to the aqueous coating composition comes from the inclusion in the composition of a specially tailored adjuvant resin. The adjuvant resin is an oligomer or a polymer and has two or more terminal functional groups reactive with the functional groups of the curing agent. Positioned between the terminal functional groups is a moiety having a hydrocarbon chain containing at least 10, such as at least 16, and for example, from 16 to 40 contiguous carbon atoms. The adjuvant resin is highly functional having a functional group equivalent weight of from 100 to 500, such as from 200 to 400, and a number average molecular weight ranging from 200 to 10,000, such as from 500 to 5,000 grams per mole as determined by gel permeation chromatography using a polystyrene standard. The adjuvant resin has a low to negligible acid value, that is the acid value is less than 5 mg, and such as less than 3 mg KOH/gram. In an embodiment of the present invention, the adjuvant resin is a soft and flexible polymer or oligomer having a cured transition temperature (following reaction with a crosslinker) less than 150° C., such as within the range of 90 to 140° C. The cured glass transition temperature is determined by art-recognized methods. For example, by DMA using a TA Instruments DMA 2980 using 1 HZ frequency, 120% Auto-strain and an oscillating amplitude of ± 20 µm from −50° C. to 200° C. using a heating rate of 3° C./minute.

The adjuvant resin can be linear or branched and typically is linear with terminal functional groups that are reactive with the functional groups of the curing agent. Examples of such functional groups are active hydrogen groups, such as hydroxyl groups, primary and secondary amine groups, carbamate groups, mercapto groups, amide groups and/or urea groups.

The adjuvant resin can be a polyester prepared from reacting a polyol with a polycarboxylic acid with the hydrocarbon chain derived from the polycarboxylic acid. Examples of suitable polycarboxylic acids are linear or branched polycarboxylic acid having from 2 to 3 carboxylic acid groups and containing a hydrocarbon chain of at least 10, such as at least 16, for example from 16 to 40 contiguous carbon atoms between the carboxylic acid groups.

Examples of suitable polycarboxylic acids are 1,10-decane dicarboxylic acid, 1,12-dodecane dicarboxylic acid, dimer and polymeric fatty polycarboxylic acids such as those sold under the trademark EMPOL such as EMPOL 1008 and EMPOL 1010 available from Cognis and those commercially available under the trademark PRIPOL 1013 available from Uniquema.

The polyols that are used in making the polyester can be selected from diols and triols including mixtures thereof. In a particular embodiment the polyol may have hydroxyl groups in the 1 and 3 position.

Examples of suitable polyols include trimethylolpropane, ditrimethylolpropane, pentaerythritol and/or dipentaerithitol. Examples of suitable diols include 1,3-propanediol, 1,4-butanediol, 1,6-hexanediol and/or neopentyl glycol.

The esterification reaction is carried out in accordance with techniques that are well known to those skilled in the art of polymer chemistry and a detailed discussion is not believed to be necessary. Generally, the reaction can be conducted by combining the ingredients and heating to a temperature of about 160° C. to about 230° C. Further details of the esterification process are disclosed in U.S. Pat. No. 5,468,802 at column 3, lines 4-20 and 39-45.

Generally, the adjuvant resin is present in an amount ranging from 1 to 50, such as 5-40 weight percent on a basis of total weight of resin solids of the coating composition. If desired, the coating composition can comprise other optional materials well known in the art of formulated surface coatings, such as surfactants, flow control agents, thixotropic agents such as bentonite clay, fillers, anti-gassing agents, organic cosolvents, catalysts, and other customary auxiliaries. These materials can constitute up to 40 percent by weight of the total weight of the coating composition.

The solids content of the aqueous coating composition generally ranges from 10 to 80 weight percent on a basis of total weight of the aqueous coating composition, such as from 15 to 60 weight percent.

In one embodiment of the present invention, the aqueous coating compositions of the present invention are used as basecoats in a multi-component composite coating composition, such as a color-plus-clear composite coating. A color-plus-clear composite coating typically comprises the aqueous coating composition of the present invention as the basecoat and a transparent or clear topcoat applied over the basecoat.

Coating compositions of the present invention can be applied to various substrates to which they adhere, including wood, metals, glass, cloth, polymeric substrates and the like. They are particularly useful for coating metals and elastomeric substrates that are found on motor vehicles. The compositions can be applied by conventional means including brushing, dipping, flow coating, spraying and the like, but they are most often applied by spraying. The usual spray techniques and equipment for air spraying and electrostatic spraying and either manual or automatic methods can be used. During application of the coating composition to the substrate, ambient relative humidity can range from about 30 to about 80 percent. The coating composition of the present invention is particularly advantageous when applied at an ambient relative humidity ranging from about 30 to about 60 percent, yielding very smooth finishes.

When used as a primer, monocoat or basecoat, a film of the coating is formed on the substrate during application of the coating composition to the substrate. Typically, the coating thickness ranges from 0.1 to 5 mils (2.54 to 127 microns), and such as 0.4 to 1.5 mils (10.16 to 38.1 microns) in thickness.

After application of the waterborne coating to the substrate, a film is formed on the surface of the substrate by driving water out of the film by heating or by an air-drying period. When the coating composition of the present invention is used as a basecoat, the heating will preferably be only for a short period of time and will be sufficient to ensure that a topcoat such as a clear coat can be applied to the coating if desired without the former dissolving the base coat composition. Suitable drying conditions will depend on the particular base coat composition and on the ambient humidity, but in general a drying time of from 1 to 30 minutes at a temperature of 20-121° C., such as 66-121° C., will be adequate to ensure that mixing of the two coats is minimized. At the same time, the basecoat film is adequately wetted by the topcoat composition so that satisfactory intercoat adhesion is obtained. Also, more than one base coat and multiple topcoats may be applied to develop the optimum appearance. Usually between coats, the previously applied coat is flashed, that is, exposed to ambient conditions for 1 to 20 minutes.

After application of the coating composition as a basecoat, a clearcoat is applied. The clearcoat can be waterborne, solventborne or powdered. In one embodiment, the topcoat coating composition is a crosslinkable coating comprising at least one thermosettable film-forming material and at least one crosslinking material. Suitable waterborne clearcoats are disclosed in U.S. Pat. No. 5,098,947 and are based on water-soluble acrylic resins. Useful solvent borne clearcoats are disclosed in U.S. Pat. Nos. 5,196,485 and 5,814,410 and include polyepoxides and polyacids curing agents. Suitable powder clearcoats are described in U.S. Pat. No. 5,663,240 and include epoxy functional acrylic copolymers and polycarboxylic acid crosslinking agents.

The topcoat coating composition can be applied to the surface of the basecoat by any of the coating processes discussed above for applying the basecoat coating composition to the substrate. The coated substrate is then heated to cure the coating layers.

In the curing operation, solvents are driven off and the film-forming materials of the clearcoat and the basecoat are each crosslinked. The heating or curing operation is usually carried out at a temperature in the range of from 71-177° C. but if needed, lower or higher temperatures may be used as necessary to activate crosslinking mechanisms. The thickness of the clearcoat usually ranges from 0.5 to 5 mils (12.7 to 127 microns), such as 1.2 to 3 mils (30.48 to 76.2 microns).

The present invention will further be described by reference to the following examples. The following examples are merely illustrative of the invention and are not intended to be limiting. Unless otherwise indicated, all parts are by weight.

EXAMPLES

Examples A-J

The following examples show the preparation of various hydroxyl functional polyesters. The polyesters of Examples A and B are in accordance with the present invention. These polyesters have three terminal hydroxyl groups and positioned between the terminal hydroxyl groups is a moiety having a hydrocarbon chain of at least 16 carbon atoms. Further the hydroxyl groups are derived from a triol having a carbon to oxygen ratio greater than 1 to 1. The polyesters have an equivalent weight between 100 and 500, a Fisher Hardness Value between 90 and 160 and an acid value less than 5.

The polyesters of Examples C-J were prepared for comparative purposes. The polyesters of Examples C and D are similar to those of Examples A and B but were prepared with diols and no triols.

The polyesters of Examples E, F, G and H are similar to those of Examples A and B but do not contain a moiety having a hydrocarbon chain of at least 16 carbon atoms between the terminal hydroxyl groups.

The polyester of Example I is similar to that of Examples A and B but is prepared with a triol having a carbon to oxygen ratio less than 1:1.

The polyester of Example J has an acid value greater than 5.

Example A

This example describes the preparation of a polyester polymer used as a component in the aqueous coating compositions of the present invention. The polyester was prepared from the following ingredients as described below.

| INGREDIENTS | PARTS BY WEIGHT (grams) |
| --- | --- |
| PRIPOL 1013[1] | 1613.0 |
| 1,6 Hexanediol | 335.7 |
| Trimethylolpropane | 500.7 |
| Butyl stannoic acid | 2.3 |
| Butyl ether of propylene glycol | 1020.0 |

[1]dimerdiacid available from Uniqema.

The polyester polymer was prepared in a four-neck round bottom flask equipped with a thermometer, mechanical stirrer, condenser, dry nitrogen sparge and a heating mantle. The first four ingredients were heated to a temperature of 200° C. and stirred in the flask until about 95 grams of distillate was collected and the acid value dropped below 1.5. The material was then cooled to a temperature of 130° C. and butyl ether propylene glycol was added. The final product was a liquid having a non-volatile content of 65.8% (as measured at 110° C. for one hour), and hydroxyl value of 189, a weight averaged molecular weight of 3344 as measured by gel permeation chromatography, a hydroxyl group equivalent weight of 207 and an acid value less than 1.

Example B

This example describes the preparation of a polyester polymer used as a component in the aqueous coating compositions of the present invention. The polyester was prepared from the following ingredients as described below.

| INGREDIENTS | PARTS BY WEIGHT (grams) |
| --- | --- |
| PRIPOL 1013 | 567.0 |
| Trimethylolpropane | 264.0 |
| Butyl stannoic acid | 0.8 |
| Triphenyl phosphate | 0.8 |
| Butyl ether propylene glycol | 356.8 |

The polyester polymer was prepared in a four-neck round bottom flask equipped with a thermometer, mechanical stirrer, condenser, dry nitrogen sparge and a heating mantle. The first four ingredients were heated to a temperature of 200° C. and stirred in the flask until about 36 grams of distillate was collected and the acid value dropped below 1.5. The material was then cooled to a temperature of 130° C. and butyl ether propylene glycol was added. The final product was a liquid having a non-volatile content of 66.2% (as measured at 110° C. for one hour), and hydroxyl value of 270, a weight averaged molecular weight of 4470 as measured by gel permeation chromatography, a hydroxyl group equivalent weight of 199 and an acid value less than 1.

Example C

Comparative

This polyester was prepared in a manner similar to Example B except that 1,6-hexanediol replaced the trimethylolpropane. The equivalent ratio of diol to diacid was 2:1. The polyester had a hydroxyl equivalent weight of 387 and an acid value less than 1.

Example D

Comparative

This polyester was prepared in a manner similar to Example B except that polytetrahydrofuran (OH equivalent weight 125, available from Invista Chemicals) replaced the trimethylolpropane. The equivalent ratio of diol to diacid was 2:1. The polyester had a hydroxyl equivalent weight of 519 and an acid value less than 1.

Example E

Comparative

This polyester was prepared in a manner similar to Example B except that adipic acid replaced the PRIPOL 1013 on an equivalent basis. The polyester had a hydroxyl equivalent weight of 982 and an acid value less than 1.

Example F

Comparative

This polyester was prepared in a manner similar to Example B except that 1,4-cyclohexane dicarboxylic acid replaced the PRIPOL 1013 on an equivalent basis. The polyester had a hydroxyl equivalent weight of 88 and an acid value less than 1.

Example G

Comparative

This polyester was prepared in a manner similar to Example B except that isophthalic acid replaced the PRIPOL 1013 on an equivalent basis. The polyester had a hydroxyl equivalent weight of 1013 and an acid value less than 1.

Example H

Comparative

This polyester was prepared in a manner similar to Example B except that 1,12-dodecanedioic acid replaced the PRIPOL 1013 on an equivalent basis. The polyester had a hydroxyl equivalent weight of 115.6 and an acid value less than 1.

Example I

Comparative

This polyester was prepared in a manner similar to Example B except that glycerol replaced the trimethylolpropane on an equivalent basis. The polyester had a hydroxyl equivalent weight of 181.3 and an acid value less than 1.

Example J

Comparative

This example describes the preparation of a polyester polymer having an acid value greater than 5. The polyester was prepared from the following ingredients as described below.

| INGREDIENTS | PARTS BY WEIGHT (grams) |
| --- | --- |
| EMPOL 1008[1] | 4206.3 |
| Cyclohexyldimethanol | 1100.5 |
| Dimethylol propionic acid | 301.5 |
| Trimellitic anhydride | 150.0 |
| Butyl ether of propylene glycol | 2241.7 |

[1] A dimer diacid available from Cognis.

The polyester polymer was prepared in a four-neck round bottom flask equipped with a thermometer, mechanical stirrer, condenser, dry nitrogen sparge and a heating mantle. The first four ingredients were heated to a temperature of 180° C. and stirred in the flask until 257 grams of distillate was collected and the acid value dropped to the range of 22-25. The material was then cooled to a temperature of 130° C. and the butyl ether of propylene glycol was added. The final product was a liquid having Gardner-Holdt viscosity of Z5-Z6, a non-volatile content of 71.1% (as measured at 110° C. for one hour), weight averaged molecular weight of 23,125 as measured by gel permeation chromatography using polystyrene standards, a hydroxyl equivalent of 1603 and an acid value of 26.

Examples 1-9

The following Examples 1-9 describe the preparation of aqueous basecoat compositions containing the polyester polymers of Examples A-I, respectively. The polyester polymers were present in the aqueous basecoat compositions in amounts of about 10 percent by weight based on weight of resin solids. For each of the basecoat compositions of Examples 1-9, a pigmented aqueous mix, "Premix A", was first prepared as described below. The Premix A components were admixed under agitation.

Premix A

| COMPONENT | PARTS BY WEIGHT (grams) |
| --- | --- |
| Deionized water | 158.3 |
| Dimethylethanolamine | 0.9 |
| Propylene glycol monobutyl ether | 9.2 |
| Ethylene glycol monohexyl ether | 9.2 |
| Polyester of Example J | 20.4 |
| Polyurethane dispersion[2] | 50.4 |
| Latex emulsion[3] | 48.4 |
| Cymel 327[4] | 5.6 |
| Mineral spirits[5] | 10.7 |
| Sodium lithium magnesium silicate[6] | 1.0 |
| Thickener Acrysol ASE 60[7] | 5.4 |
| Tint[8] | 117.3 |

[2] Prepared as follows: A polyurethane prepolymer was first prepared as follows: A latex containing a hydrophilic polyurethane prepolymer was prepared by adding 783.2 g of N-methyl pyrrolidine, 585.6 g of hydroxyethyl methacrylate, 603.6 g of dimethylol propionic acid, 5.9 g of butylated hydroxytoluene, 5.9 g of triphenyl phosphite, and 5.9 g of dibutyl tin dilaurate to a four necked round bottom flask fitted with a thermocouple, mechanical stirrer, and condenser and heated to 100° C. to obtain a homegeneous solution. Then 3,000.0 g of poly(butylene oxide) molecular weight 1,000 was heated to 70° C. and added. To this mixture at 90° C., isophorone diisocyanate 1,667.3 g was added over 90 minutes. The isocyanate container was rinsed with 153.0 g of butyl acrylate. The reaction mixture was stirred at 90° C. for two hours. Then 2,979 g of butyl acrylate was added and the mixture cooled to ambient temperature. The final product had a non-volatile content of 59.1% (measured at 110° C. for one hour), a Gardner-Holdt viscosity (ASTM D1545-89) of W- and an acid value of 25.6 as measured by potentiometric titration with KOH. This polyurethane prepolymer was used in the preparation of an aqueous polyurethane dispersion as follows:

| INGREDIENTS | PARTS BY WEIGHT (grams) |
| --- | --- |
| Pre-emulsion-CHARGE 1 | |
| Distilled Water | 13,320.0 |
| Igepal CO-897[9] | 171.4 |
| Diisopropanolamine | 360.0 |
| Polyurethane prepolymer | 8,000.0 |
| Ethyleneglycol dimethacrylate | 360.0 |
| Methyl methacrylate | 2,280.0 |
| Butyl acrylate | 2,000.0 |
| FEED 1 | |
| Distilled Water | 480.0 |
| t-Butylhydroperoxide | 12.0 |
| FEED 2 | |
| Distilled Water | 480.0 |
| Ferrous ammonium sulfate | 0.24 |
| Sodium metabisulfite | 12.0 |
| FEED 3 | |
| Distilled Water | 48.0 |
| Proxel GXL[10] | 24.0 |

Charge 1 was mixed in a stainless steel beaker until homogeneous and the mixture was microfluidized, by passing once through a Microfluidizer ® M110T at 8000 psi into a stainless steel beaker and rinsed with 600 g of water. The microfluidized mixture was transferred to a stainless steel reactor fitted with a thermometer, mechanical stirrer, and a condenser, sparged with nitrogen gas. Feed 1 was added to the reactor and stirred for one minute. Then, Feed 2 was added to the reactor over 30 minutes, an exothermic reaction was observed. The polymer was cooled to 30° C. and Feed 3 was added. The final pH of the latex was 6.6, the nonvolatile content was 43.2%, (measured at 110° C. for one hour), the Brookfield viscosity was 86 cps (spindle #1, 50 rpm, 25° C.), and the particle size was 96 nanometers.
[3] Latex emulsion was prepared according to U.S. Pat. No. 6,762,240, Example 1 except that all methyl methacrylate and butyl acrylate were replaced with butyl methacrylate, and ethyleneglycol dimethacrylate was replaced with hexanediol diacrylate on weight basis.
[4] Imino functional methylated melamine formaldehyde resin available from Cytec Industries, Inc.
[5] Shellsol odorless mineral spirits available from Shell Chemical Company.
[6] Laponite RD available from Southern Clay Products.
[7] Acrysol ASE 60 available from Rohm & Haas Company.
[8] Black pigment available from Cabot Corp. as Monarch Black 1300 dispersed in an acrylic grind vehicle (35% butyl acrylate, 30% styrene, 18% butyl methacrylate, 8.5% 2-hydroxyethyl acrylate and 8.5% acrylic acid) at a total pigment to binder ratio (P/B) of 0.35.
[9] Nonionic surfactant available from Rhodia; 70% in water.
[10] Biocide containing 9.3% 1,2-Benzisothiazolin-3-one as active ingredient, available from Syngenta Corporation, Wilmington, DE.

Aqueous Basecoat Compositions

The aqueous basecoat compositions of Examples 1-9 were prepared as described below from the following ingredients. Amounts listed below are in parts by weight (grams) unless otherwise indicated.

at 60% relative humidity and 21° C. onto cold rolled steel substrates which had been previously electrocoated with ED5000 (available commercially from PPG Industries, Inc.), and primed with 1177225A grey primer (available commercially from PPG Industries, Inc.). The aqueous basecoats were applied such that the dry or cured film thickness of each

| COMPONENT | Example 1 (83C) | Example 2 (83D) | Example 3 (83J) | Example 4 (83F) | Example 5 (83K) | Example 6 (83G) | Example 7 (83H) | Example 8 (83I) | Example 9 (83E) |
|---|---|---|---|---|---|---|---|---|---|
| Premix A | 448.7 | 448.7 | 448.7 | 448.7 | 448.7 | 448.7 | 448.7 | 448.7 | 448.7 |
| Propylene glycol monobutyl ether | 13.3 | 13.3 | 13.3 | 13.3 | 13.3 | 13.3 | 13.3 | 13.3 | 13.3 |
| Cymel 327[4] | 11.1 | 11.1 | 11.1 | 11.1 | 11.1 | 11.1 | 11.1 | 11.1 | 11.1 |
| Polyester of Example A | 18.1 | | | | | | | | |
| Polyester of Example B | | 16.92 | | | | | | | |
| Polyester of Example C | | | 17.2 | | | | | | |
| Polyester of Example D | | | | 17.1 | | | | | |
| Polyester of Example E | | | | | 16.1 | | | | |
| Polyester of Example F | | | | | | 16.0 | | | |
| Polyester of Example G | | | | | | | 15.3 | | |
| Polyester of Example H | | | | | | | | 16.7 | |
| Polyester of Example I | | | | | | | | | 16.6 |
| 2-ethylhexanol | 5.4 | 5.4 | 5.4 | 5.4 | 5.4 | 5.4 | 5.4 | 5.4 | 5.4 |
| Mineral spirits[5] | 7.3 | 7.3 | 7.3 | 7.3 | 7.3 | 7.3 | 7.3 | 7.3 | 7.3 |
| Polypropylene glycol[11] | 6.3 | 6.3 | 6.3 | 6.3 | 6.3 | 6.3 | 6.3 | 6.3 | 6.3 |

[11]Synalox 100-D45 available from Dow Chemical Company.

Each of the aqueous basecoat compositions of Examples 1-9 was prepared by mixing the above-listed ingredients under agitation. The pH of each composition was adjusted to 8.4-8.6 using an appropriate amount of a 50% aqueous solution of dimethylethanolamine. The viscosity of each of the aqueous basecoat compositions then was reduced to 33 to 37 seconds spray viscosity (DIN #4 cup) using deionized water.

Example 10

The following comparative example describes the preparation of an aqueous basecoat composition containing the polyester polymers of Example J. The components were admixed under agitation.

| COMPONENT | PARTS BY WEIGHT (grams) |
|---|---|
| Deionized water | 158.3 |
| Dimethylethanolamine | 0.9 |
| Propylene glycol monobutyl ether | 22.5 |
| Ethylene glycol monohexyl ether | 9.2 |
| Polyester of Example J | 40.8 |
| Polyurethane dispersion[2] | 50.4 |
| Latex emulsion[3] | 48.4 |
| Cymel 327[4] | 6.7 |
| Mineral spirits[5] | 10.7 |
| Sodium lithium magnesium silicate[6] | 1.0 |
| Thickener Acrysol ASE 60[7] | 5.4 |
| Tint[8] | 117.3 |
| 2-ethylhexanol | 5.4 |
| Mineral spirits[5] | 7.3 |
| Polypropylene glycol[11] | 6.3 |

The pH and viscosity of the composition were adjusted as per Example 9.

Adhesion Test Panel Preparation

Each aqueous basecoat of Examples 1-10 was spray applied, using a Binks 95 gun with a 66SS nozzle and 66SD air cap, in a humidity and temperature controlled spray booth coating was in the range of 0.45 to 0.55 mils (11.4 to 14.0 micrometers) thickness. The basecoated test panels were allowed an ambient air flash period of 3 minutes at 21° C. and 60% relative humidity, followed by heating for 3 minutes at 80° C. to further dehydrate the coating. After dehydration, a clearcoat (Ceramiclear, a two-component isocyanate containing clearcoat available from PPG Industries, Inc.) was spray applied over the dehydrated basecoats. After each clearcoat application, the coated panels were give a 10-minute ambient temperature air flash period followed by curing at 141° C. for 30 minutes. The clearcoat was applied such that between 1.4 and 1.6 mils (35.6 to 40.6 micrometers) of dry clearcoat film thickness was achieved.

Adhesion Test Panel Evaluation

Each coated test panel was scribed with a PA-2056 blade in PA-2058 blade holder multi-blade cutter with 2.0 mm spaced teeth available commercially from Paul N. Gardner Company, Inc. Black 4651 Tesa tape available commercially from Tesa Tape Inc. was firmly applied to the scribed area and then removed in a continuous motion. The area is then inspected for removal of coating from the substrate. The severity of coating removal is rated on a scale of 0 to 5 as follows: A 5 rating indicates edges of the cuts are completely smooth and none of the lattice squares are detached. A 4 rating indicates small areas of coating detached at the intersections of the cuts. Less than five percent of the test area is affected. A 3 rating indicates small areas of coating detached at the intersections of the cuts and along the edges of the lattice squares. Five to fifteen percent of the test area is affected. A 2 rating indicates the coating has detached along the edges and on parts of the lattice squares. Fifteen to thirty percent of the test area is affected. A 1 rating indicates the coating has detached in large ribbons along the cut edges and whole squares have detached. Thirty to sixty five percent of the test area is affected. A 0 rating indicates the coating has detached in large ribbons along the cut edges and whole squares have detached. Over sixty five percent of the test area is affected. The taping and inspection process is repeated five times (six total) for a given scribed area. Testing results are reported in the table below.

High Bake Repair Test Panel Preparation

Each aqueous basecoat of Examples 1-10 was spray applied, using a Binks 95 gun with a 66SS nozzle and 66SD air cap, in a humidity and temperature controlled spray booth at 60% relative humidity and 21° C. onto cold rolled steel substrates which had been previously electrocoated with ED5000 (available commercially from PPG Industries, Inc.), and primed with Funktionsprimer Anthracite 7245 (available commercially from Hemmelrath.). The aqueous basecoats were applied such that the dry or cured film thickness of each coating was in the range of 0.45 to 0.55 mils (11.4 to 14.0 micrometers) thickness. The basecoated test panels were allowed an ambient air flash period of 3 minutes at 21° C. and 60% relative humidity, followed by heating for 3 minutes at 80° C. to further dehydrate the coating. After dehydration, a clearcoat (Ceramiclear, a two-component isocyanate containing clearcoat available from PPG Industries, Inc.) was spray applied over the dehydrated basecoats. After each clearcoat application, the coated panels were give a 10-minute ambient temperature air flash period followed by curing at 141° C. for 30 minutes. The clearcoat was applied such that between 1.4 and 1.6 mils (35.6 to 40.6 micrometers) of dry clearcoat film thickness was achieved. The coated panels were cooled to room temperature then a second layer of each aqueous basecoat of Examples 1-10 and of clear coat was spray applied, using a Binks 95 gun with a 66SS nozzle and 66SD air cap, in a humidity and temperature controlled spray booth at 60% relative humidity and 21° C. onto panels which had been previously painted. The aqueous basecoats were applied such that the dry or cured film thickness of each coating was in the range of 0.45 to 0.55 mils (11.4 to 14.0 micrometers) thickness. The basecoated test panels were allowed an ambient air flash period of 3 minutes at 21° C. and 60% relative humidity, followed by heating for 3 minutes at 80° C. to further dehydrate the coating. After dehydration, a clearcoat (Ceramiclear, a two-component isocyanate containing clearcoat available from PPG Industries, Inc.) was spray applied over the dehydrated basecoats. After each clearcoat application, the coated panels were give a 10-minute ambient temperature air flash period followed by curing at 141° C. for 30 minutes. The clearcoat was applied such that between 1.4 and 1.6 mils (35.6 to 40.6 micrometers) of dry clearcoat film thickness was achieved.

High Bake Repair Adhesion Test Panel Evaluation

Each coated test panel was scribed with a multi-blade cutter with 2.0 mm spaced teeth comprising PA-2056 blade in PA-2058 blade holder available commercially from Paul N. Gardner Company, Inc. Black 4651 Tesa tape available commercially from Tesa Tape Inc. was firmly applied to the scribed area and then removed in a continuous motion. The area was then inspected for removal of coating from the substrate. The severity of coating removal was rated on a scale of 0 to 5 as follows: A 5 rating indicates edges of the cuts are completely smooth and none of the lattice squares are detached. A 4 rating indicates small areas of coating detached at the intersections of the cuts. Less than five percent of the test area is affected. A 3 rating indicates small areas of coating detached at the intersections of the cuts and along the edges of the lattice squares. Five to fifteen percent of the test area is affected. A 2 rating indicates the coating has detached along the edges and on parts of the lattice squares. Fifteen to thirty percent of the test area is affected. A 1 rating indicates the coating has detached in large ribbons along the cut edges and whole squares have detached. Thirty to sixty five percent of the test area is affected. A 0 rating indicates the coating has detached in large ribbons along the cut edges and whole squares have detached. Over sixty five percent of the test area is affected. The taping and inspection process is repeated five times (six total) for a given scribed area. Testing results are reported in the table below.

High Bake Repair Chip Test Panel Evaluation

Each coated panel prepared as described above for High Bake Repair Test Panel Preparation was tested using an Erichsen Stone Hammer Blow Testing Instrument, Model 508, to impact the painted surface with two individual 500 g samples of S-708 fractured steel shot 1.57 mm ($\frac{1}{16}$") with 2 bars operating pressure at a rate of 10 seconds per 500 g projectile. After testing, masking tape was applied to and then removed from the impacted surface, then the severity of the chip damage was rated on a scale of 0.5 to 5.0 according to DIN 55996-1. A rating of 0.5 indicates excellent chip performance with damage to about two tenths of one percent of the impacted area. A rating of 5.0 indicates very poor chip performance with damage to greater than eighty one percent of the impacted area. A performance rating of 2.5 or lower is acceptable, while a rating of greater than 2.5 is undesirable. Testing results are reported in the table below.

Pinhole Test Panel Preparation and Evaluation

Each aqueous basecoat of Examples 1-10 was spray applied, using a Behr electrostatic bell atomizer in a humidity and temperature controlled spray booth at 60% relative humidity and 21° C. onto cold rolled steel substrates that had been previously electrocoated with ED5000 (available commercially from PPG Industries, Inc.). The bell cup speed was thirty five thousand revolutions per minute. The aqueous basecoats were applied such that the dry or cured film thickness of each coating varied gradually across the length of the panel from a range of 0.45 to 0.50 mils (11.4 to 12.7 micrometers) thickness up to the range of 0.95 to 1.05 mils (24.1 to 26.7 micrometers). The basecoated test panels were allowed an ambient air flash period of 3 minutes at 21° C. and 60% relative humidity, followed by heating for 3 minutes at 80° C. to further dehydrate the coating. After dehydration, a clearcoat (Ceramiclear, a two-component isocyanate containing clearcoat available from PPG Industries, Inc.) was spray applied over the dehydrated basecoats. After each clearcoat application, the coated panels were give a 10-minute ambient temperature air flash period followed by curing at 141° C. for 30 minutes. The clearcoat was applied such that between 1.0 and 1.1 mils (25.4 and 27.9 micrometers) of dry clearcoat film thickness was achieved. Each coated test panel was examined visually for pinhole defects, and the basecoat dry film thickness at which pinhole defects initially occur was measured and recorded. The occurrence of pinhole defects at basecoat dry film thickness of less than 0.7 mils, as applied in this test, is undesirable. The absence of pinhole defects at basecoat dry film thickness of greater than 0.7 mils, as applied in this test, is more desirable. The absence of pinhole defects at basecoat dry film thickness of greater than 0.8 mils, as applied in this test, is most desirable. Testing results are reported in the table below.

TABLE

TESTING RESULTS OF EXAMPLES 1-10

| Coating Example | Adhesion | High Bake Repair Adhesion | High Bake Repair Chip Resistance | Pinhole Resistance |
|---|---|---|---|---|
| 1 | 5 | 5 | 2.5 | 0.99 |
| 2 | 5 | 1 | 2.5 | 0.82 |
| 3 | 2 | 2 | 2.25-2.5 | 0.81 |
| 4 | 2 | 1 | 2.25 | 0.70 |
| 5 | 2 | 1 | 2.50 | 0.79 |
| 6 | 3 | 2 | 2.75 | 0.66 |
| 7 | 2 | 1 | 2.75 | 0.66 |
| 8 | 5 | 5 | 2.75 | 0.51 |
| 9 | 2 | 2 | 2.50 | 0.63 |
| 10 | 5 | 2 | 2.50 | 0.56 |

The results reported in the Table above show that the compositions of the invention in Examples 1 and 2 provide cured coatings with the best overall properties. Comparative Examples 3-7 and 9 have relatively poor adhesion. Examples 6-8 have relatively poor chip resistance and Examples 4, 6 and 7-10 have relatively poor pinhole resistance.

Whereas the present invention has been described in connection with certain embodiments, the present invention is not limited to the particular embodiments disclosed, but is intended to cover modifications that are within the spirit and scope of the inventions, as defined by the appended claims.

The invention claimed is:

1. An aqueous coating composition comprising
   (a) water,
   (b) coloring agent,
   (c) a film-forming polymer containing functional groups,
   (d) a curing agent for (c) having functional groups that are reactive with the functional groups of (c), and
   (e) a linear adjuvant resin having hydroxyl groups reactive with the functional groups of (d), wherein the hydroxyl groups are located at the terminal ends of the adjuvant resin; and wherein the adjuvant resin further comprises a hydrocarbon moiety comprising from 16 to 40 contiguous carbon atoms positioned between the hydroxyl groups; and wherein the hydroxyl groups are derived from a polyol and the hydrocarbon moiety is derived from a linear dicarboxylic acid; the adjuvant resin having a hydroxyl group equivalent weight of from 100 to 500 and an acid value less than 5.

2. The composition of claim 1, wherein the polyol comprises trimethylolpropane, ditrimethylolpropane, pentaerythritol, dipentaerythritol, or a diol.

3. The composition of claim 2, wherein the diol comprises 1,6-hexanediol.

4. The composition of claim 1, wherein the linear dicarboxylic acid comprises a fatty dicarboxylic acid.

5. The composition of claim 4, wherein the fatty dicarboxylic acid has a hydrocarbon chain of from 16 to 40 contiguous carbon atoms between the carboxylic acid groups.

6. The composition of claim 2, wherein the adjuvant resin is present in the composition in amounts of 1 to 50 percent by weight based on weight of resins solids in the composition.

\* \* \* \* \*